United States Patent
Wong et al.

(10) Patent No.: US 7,286,477 B1
(45) Date of Patent: Oct. 23, 2007

(54) MODULE INTERFACE CARRIER DATA RATE ADAPTATION TECHNIQUES

(75) Inventors: Chi-Yin Wong, Los Gatos, CA (US); Sergey Svoysky, Germantown, MD (US)

(73) Assignee: Network Equipment Technologies, Inc., Fremont, CA (US)

( * ) Notice: Subject to any disclaimer, the term of this patent is extended or adjusted under 35 U.S.C. 154(b) by 1107 days.

(21) Appl. No.: 10/213,280

(22) Filed: Aug. 5, 2002

(51) Int. Cl.
*G01R 31/08* (2006.01)

(52) U.S. Cl. ............. 370/232; 370/428; 370/413; 370/235

(58) Field of Classification Search ........... 370/419, 370/412, 463
See application file for complete search history.

(56) References Cited

U.S. PATENT DOCUMENTS

| | | | | |
|---|---|---|---|---|
| 5,513,172 A | * | 4/1996 | Shikama et al. | 370/428 |
| 6,094,692 A | * | 7/2000 | Kalkunte | 710/34 |
| 6,813,279 B1 | * | 11/2004 | Trainin | 370/466 |

* cited by examiner

*Primary Examiner*—Bob A. Phunkulh
(74) *Attorney, Agent, or Firm*—Townsend and Townsend and Crew, LLP

(57) ABSTRACT

Techniques for adapting data rates from a first to a second system in a telecommunication system are provided. The techniques on used on data communications in the ingress or egress direction. The first system transfers data at a first data rate that is faster than a data rate of a second system. The techniques are used to adapt data received at the first data rate for sending to the second system at the second data rate.

5 Claims, 4 Drawing Sheets

MODULE INTERFACE CARRIER DATA RATE ADAPTATION TECHNIQUES

CROSS-REFERENCES TO RELATED APPLICATIONS

The present application is related to U.S. Nonprovisional patent application No. 10/213,266, filed on the same day, Aug. 5, 2002, entitled "System Partitioning to Allow Uniform Interfacing to Port Modules," which is hereby incorporated by reference for all purposes.

BACKGROUND OF THE INVENTION

The present invention relates generally to telecommunications and more specifically to a system and method for adapting data rates between telecommunication devices.

The amount of data communicated through networks, such as the Internet, is increasing dramatically. To meet the increased demand for network bandwidth, data networks that transfer data at faster and faster rates have been developed. As new networks are developed, different formats for the data are also developed where the networks transfer data in the formats at different data rates. Because the formats and data rates vary between networks, not all networks transfer data at the same speed. Additionally, telecommunications systems connected to the network process data at different rates than that of the networks. Telecommunication systems, such as aggregators, may aggregate data from different networks that transfer data at varying data rates. Also, a processor in the aggregator typically processes data at a set rate. Thus, a telecommunications system's processor and the networks process or transfer data at different rates.

Problems are encountered in transferring data between the aggregator's processor and a network because of the difference in data rates. For example, data cannot be continuously streamed between a first system processing data at a lower rate and a second system processing data at a higher rate without any underflow of data at the second system. Because the first system sends data at a rate slower than the second system, the second system experiences lapses in time where data is not available for processing.

One method for avoiding the above problem is to store an entire data packet in a buffer. Once the entire data packet is stored in the buffer, the data packet is sent to the second system at the second system's data rate. Thus, the second system does not experience any moments where data is not available for processing.

Many disadvantages, however, exist when the entire data packet is stored. For example, storing the entire packet can take a large amount of time, especially when large packets of data are being transferred. Also, with networks transferring large packets of data, not only is the time required to store the entire packet extensive, a large buffer is required at the first or second system. Additionally, with users requiring data transferred at faster speeds, any time required to store an entire data packet will be time lost in transferring data.

BRIEF SUMMARY OF THE INVENTION

The present invention provides various techniques for adapting data rates between a first and second system in a telecommunication system. The techniques are for data communications in the ingress or egress direction.

In one embodiment, a method for transferring an amount of data between a first system and a second system in a telecommunications system is provided. The first system transfers data at a first data rate and the second system transfers data at a second data rate, where the second data rate is higher than the first data rate. The method comprises calculating a difference in data rates between the first data rate of the first system and second data rate of the second system. A partial amount of data from the amount of data is then calculated. The partial amount is then sent to and stored in a buffer. In one embodiment, the partial amount of data determines a maximum packet size that may be transferred.

After the partial amount of data is stored in the buffer, the amount of data not already sent to the buffer along with the partial amount of data in the buffer is sent to the second system. Also, in one embodiment, the data rate of a total amount of data sent from the first system to the second system is substantially equal to the higher data rate of the second system.

In another embodiment, a method for transferring an amount of data between a first system and a second system in a telecommunications system is provided. The first system transfers data at a first data rate and the second system transfers data at a second data rate, where the second data rate is higher than the first data rate.

One embodiment of the method includes receiving the amount of data at the first data rate during a period of time at the first system. The first system is polled for available data at one or more polling times in the period of time. Also, one or more cells of data are sent at the second data rate during the period of time. The cells of data include data from the amount of data received at the first data rate if the data is available at a polling time in the one or more polling times and include an empty character indication is included in the cell if data is not available at the polling time.

A further understanding of the nature and advantages of the invention herein may be realized by reference of the remaining portions in the specifications and the attached drawings.

DETAILED DESCRIPTION OF THE INVENTION

Figure 1:
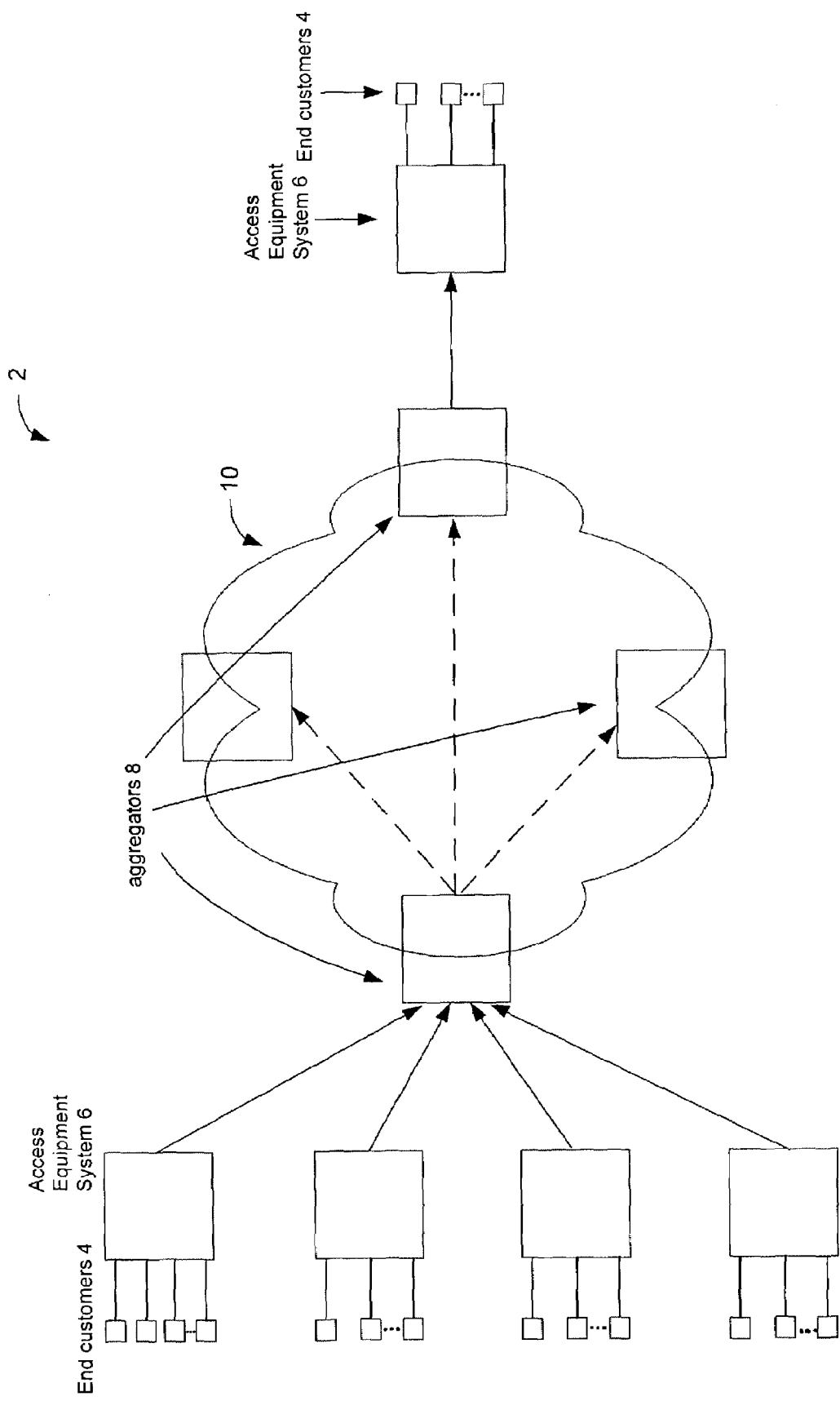
FIG. 1 depicts a simplified block diagram of a telecommunications system according to one embodiment of the present invention.

FIG. 1 depicts a simplified block diagram of a telecommunications system 2 according to one embodiment of the present invention. Telecommunications system 2 includes end customer devices 4, access equipment 6, aggregators 8, and a network 10.

End customer devices 4 are computing devices, such as personal computers (PCs), workstations, personal digital assistants (PDAs), cellular phones, personal PCs, and the like, that communicate data. The data are transmitted to access equipment system 6 through communication lines.

Access equipment systems 6 aggregate and multiplex the data received from end customer devices 4. Examples of access equipment systems 6 include digital subscriber line access multiplexer (DSLAM), multiplexers, etc. Data received at access equipment systems 6 are then sent to aggregators 8. Data from a single access equipment system 6 are typically sent in a specific data format and a specific data rate. For example, the data formats include SONET/SDH (OC3, OC12, OC48, etc.), DS3/E3, Ethernet, Gigabit Ethernet, etc. Data in these formats are also transferred at various data rates, where a fixed data rate is associated with a format.

Aggregator 10 receives the data from access equipment systems 6 in the different formats. Aggregator 10 processes the data in the different formats and may send the data to one or more other aggregators 10. Data may be sent in different formats than the received data format. Data are then sent to access equipment system 6 and to another end customer 4 through network 12. Network 12 may be any network, such as the Internet.

Figure 2:
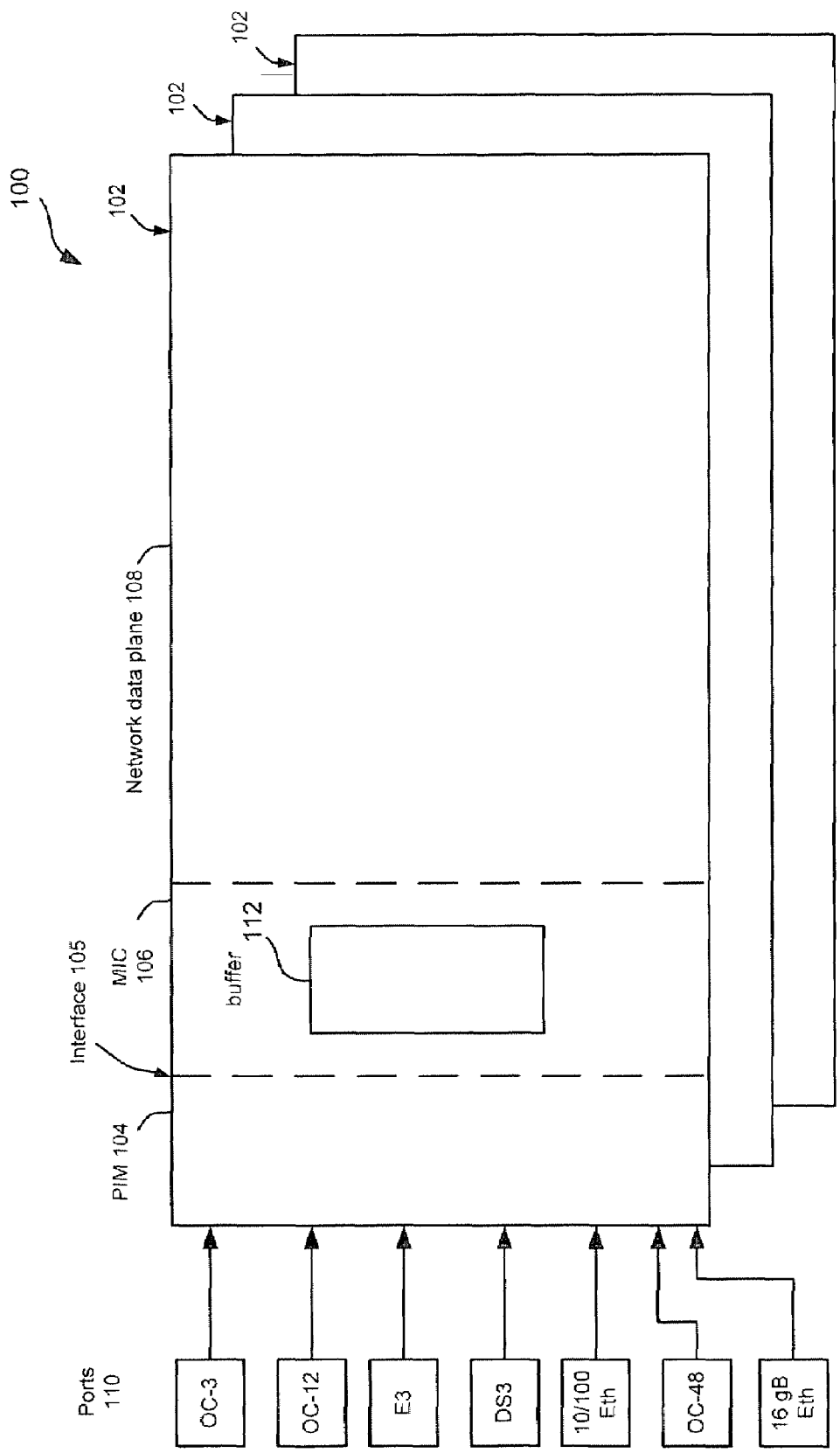
FIG. 2 depicts a simplified block diagram of a network communication system according to one embodiment of the present invention.

FIG. 2 depicts a simplified block diagram of a network communications system 100 according to one embodiment of the present invention. In one embodiment, network communications system 100 is included in aggregator 10. A plurality of network communication modules 102 are provided to receive data from a variety of ports 110. Each network communication module 102 includes a port interface module (PIM) 104, a module interface carrier (MIC) 106, and a network data plane 108.

Each network communications module 102 may receive data or a single network communications module 102 may receive data and then communicate the data to the other network communications modules 102. In one embodiment, data refer to data communicated in packets, cells, or frames. These terms may be used interchangeably herein. In one embodiment, data is communicated between network communication modules 102 through a backplane.

PIM 104 provides a physical termination of a port. The ports are illustrated as ports 110, where ports 110 are ports for data being transferred in different formats and different data rates. PIM 104 receives data in the different formats and data rates from ports 110. Examples of formats for ports 110 include ports that receive data in the formats of SONET/SDH (OC3, OC12, OC48, etc.), DS3/E3, Ethernet, Gigabit Ethernet, etc. Also, each of these formats transfers data at different data rates.

PIM 104 is configured to extract data from ports 110. In one embodiment, PIM 104 may include two PIMs with each PIM including eight ports. Thus, in this embodiment, sixteen ports 110 may be supported.

An interface 105 is provided in between PIM 104 and MIC 106. In one embodiment, interface 105 is a uniform industry standard interface, such as a Utopia/POSII or Utopia/POSIII interface. Interface 105 provides a standard interface to facilitate data communications between PIM 104 and MIC 106.

MIC 106 is configured to receive the extracted data from PIM 104 through interface 105. MIC 106 receives data from different ports 110 through PIM 104 at a first data rate and sends the data at a second data rate to network data plane 108. Additionally, MIC 106 receives data from network data plane 108 at a first data rate and sends the data to ports 110 connected to PIM 104 at a second data rate.

MIC 106 also includes a buffer 112. Buffer 112 is used to store data and more specifically to store a partial amount of data from a frame of data being transferred from network data plane 108. The use of buffer 112 will be described in more detail below.

Network data plane 108 is a processor/switching unit configured to receive data from MIC 106 (ingress direction). Additionally, network data plane 108 is configured to send data to MIC 106 (egress direction). In one embodiment, network data plane 108 processes data at a certain fixed data rate.

Data are carried in an ingress direction from PIM 104 through MIC 106 to network data plane 108. Additionally, egress data are carried from network data plane 108 through MIC 106 to PIM 102 and ports 110. In the ingress direction, data carrying capacity in network data plane 108 may be higher than the data carrying capacity of ports 110. Thus, ports 110 connected to PIM 104 may transfer data at a data rate that is lower than the data rate of network data plane 108. In the egress direction, data carrying capacity in network data plane 108 may be lower than the data carrying capacity of ports 110. In order to adapt the data rates between network data plane 108 and ports 110 connected to PIM 104, MIC 106 uses techniques for data rate adaptation as described below for both the egress and ingress directions. In one embodiment, the techniques are implemented by MIC 106 using software, hardware, or any combination thereof.

In one embodiment, the data that are transferred in the ingress and egress directions include a variable-length data packet. Once a first system starts sending a variable-length data packet to a second system, the first system has to keep sending data to the second system until end of packet.

In one embodiment, a cell of data includes a number of words of a certain size that are used to store portions of the variable-length data packet. For example, the cell of data includes sixteen or seventeen 32-bit words. Embodiments of cells of data are described in U.S. Nonprovisional patent application No. 10/213,266, filed on the same day, Aug. 5, 2002, entitled "System Partitioning to Allow Uniform Interfacing to Port Modules," which is hereby incorporated by reference for all purposes. Although embodiments of cells of data may be described as including sixteen seventeen 32-bit words, it will be understood that cells of data may include any number of words of any size and that a person skilled in the art will appreciate other mediums of transferring data between systems.

In the ingress direction, MIC 106 continuously sends cells of data to network data plane 108 at network data plane's 108 data rate. In order to send cells of data at network data plane's 108 data rate, PIM 104 is polled at certain time periods for data before a time for sending a cell of data. If data is available at that time, the data is inserted into a 32-bit word in the cell of data. If data is not available at that time, empty bytes are inserted into the 32-bit word in the cell of data. This process continues until a cell of data has been filled. The filled cell of data is then sent to network data plane 108 at the time that satisfies network data plane's 108 data rate.

Accordingly, when data from a variable length packet is received at PIM 104, the data is included in a cell of data. PIM 104 is then polled at certain time intervals and data from the variable length packet is included in the cell of data if it is available, or empty byte characters are included in the cell of data if data is not available. Once the cell is filled, the cell is sent at the data rate of network data plane 108. The process of sending cells of data continues and the complete frame of data will be sent to network data plane 108. The end of the frame is indicated by an end of frame special character. In one embodiment, the above process does not require any frame buffering.

In the egress direction, MIC 106 calculates a difference in data rates between the data rate of network data plane 108 and the data rate of a destination port 110 in which the data is being sent. A partial amount of data from a frame of data being sent to destination port 110 is then calculated from the data rate difference. The partial amount of data is stored in buffer 112 before forwarding the data to destination port 110 through PIM 104. The partial amount of data stored in buffer 112 is used to adapt the difference in data rates between network data plane 108 and destination port 110. MIC 106 receives data at the data rate of network data plane 108 and is thus at least able to send data to destination port 110 at that data rate. However, using the partial amount of data stored in buffer 112, MIC 106 is able to send the data received in addition to data from the partial amount of data to destination port 110 at the data rate of destination port 110.

After the partial amount of data is stored, data from the frame of data not already sent is sent to buffer 112. At the same time, data from buffer 112 is sent from MIC 106 through PIM 104 to destination port 110. Thus, data is sent from network data plane 108 through buffer 112 to PIM 104 and destination port 110. Also, the data sent from buffer 112 is sent at the data rate of destination port 110.

Figure 3:
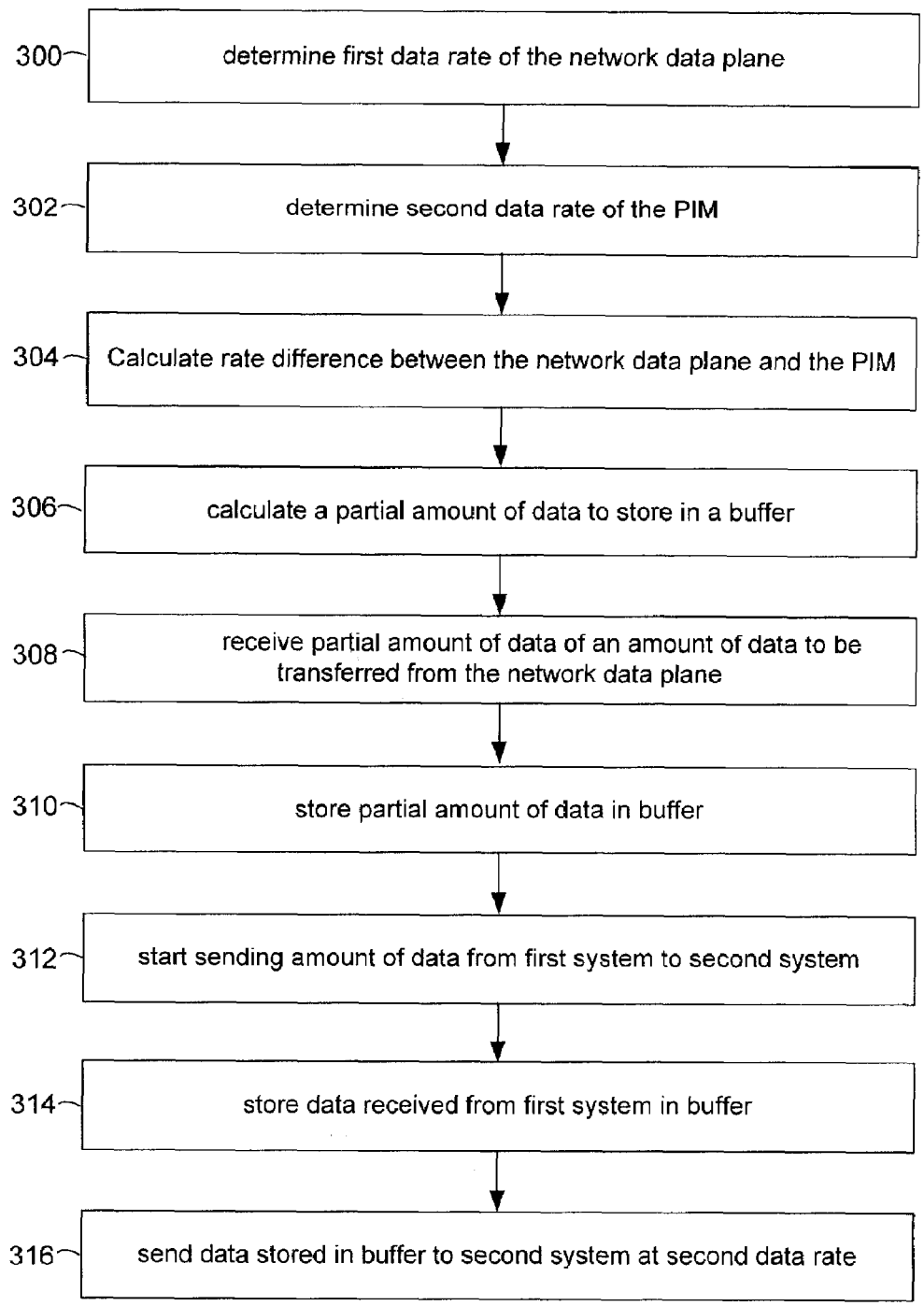
FIG. 3 illustrates a simplified flowchart for a method for performing data rate adaptation in the egress direction according to one embodiment.

FIG. 3 illustrates a simplified flowchart of a method for performing data rate adaptation in the egress direction according to one embodiment. In step 300, MIC 106 determines a first data rate for network data plane 108. MIC 106 can determine the data rate of network data plane 108 because its data rate is fixed.

In step 302, MIC 106 determines a second data rate for a destination port 110 connected to PIM 104 that data from network data plane 108 will be transferred to. MIC 106 determines the data rate for destination port 110 when a first cell of data containing data from a frame of data to be transferred to destination port 110 is received. In one embodiment, information contained in the cell indicates an identification for destination port 110. From the identification, MIC 106 determines the data rate of destination port 110 because each port 110 transfers data at a certain data rate. It is assumed for illustrative purposes that the data rate for network data plane 108 is slower than a data rate for destination port 110.

In step 304, MIC 106 calculates a rate difference between network data plane 108 and destination port 110. Once the data rate difference is determined, MIC 106 calculates a partial amount of data to store in buffer 112 in step 306. The calculated partial amount of data is smaller than the frame of data to be transferred. Also, the partial amount of data allows MIC 106 to adapt the data rate of network data plane 108 to be equal to the data rate of destination port 110 when the partial amount of data and data from the frame of data not already sent to buffer 112 is transferred to destination port 110.

In step 308, the partial amount of data is transferred to buffer 112 from network data plane 108.

In step 310, the partial amount of data transferred from network data plane 108 is stored in buffer 112. Also, the partial amount of data is transferred before network data plane 108 starts to send the entire frame of data.

Once the partial amount of data is stored in buffer 112, in step 312, network data plane 108 starts sending the frame of data that has not been sent to buffer 112 to buffer 112. In one embodiment, data from the frame of data is sent in one or more cells of data.

In step 314, the data sent from network data plane 108 is stored in buffer 112. The data is stored in buffer 112 after the already stored partial amount of data.

In step 316, at the same time as data is sent from network data plane 108, data stored in buffer 112 is sent to destination port 110 through PIM 104 at the second data rate. The data sent to destination port 110 starts with the partial amount of data stored followed by the data from the frame of data not already sent.

The process of sending data from buffer 112 to the destination port 110 through PIM 104 at the second data rate continues until the complete frame of data has been sent from network data plane 108 to destination port 110 through PIM 104. Using the partial amount of data from the frame of data stored in buffer 112 before the rest of the frame of data was sent from network data plane 108, MIC 106 is able to send data to the destination port 110 at the second data rate without any underflow of the second data rate. The data rate adaptation is accomplished because the partial amount of data stored in the buffer serves to adjust the difference in data rates. As data is received from network data plane 108 at the first data rate, the stored partial amount of data is sent along with the data received at the first data rate in the second data rate. Thus, if the partial amount of data was not stored, data would be received at the first data rate and MIC 106 would be able to send the data at the first data rate.

As mentioned above, a maximum packet size that can be transferred without frame buffering is calculated. The partial amount of data that can be stored in buffer 112 determines the maximum packet size that can be transferred. An exemplary embodiment of the calculation will now be described.

It is assumed that a frame of data will be transferred from network data plane 108 to a destination port 110, where the data rate of destination port 110 is, e.g., approximately 150 Mbps (Mbits per second) and the data rate of network data plane 108 is 144 Mbps. In one embodiment, network data plane's 108 data rate is calculated by taking network data plane's 108 rate of sending cells for a port in sixteen ports (6/16 Mcell/s). The payload in each cell is 48 bytes*8 bits. Thus, the data rate is $(6/16)*48*8=144$ Mbps.

Assuming the variables T=time in for example, micro seconds, to transmit a frame of length X bits, and Y=partial data size to store in buffer 112 in bits, the following equations are solved: $150*T=X$; and $144*T=X-Y$. The first equation denotes that it takes 150 Mbps times an amount of time to transfer X bits. The second equation denotes that is takes 144 Mbps time an amount of time to transfer (X-Y) bits. In order to prevent under-run, MIC 106 pre-stores the difference, Y. By substituting $X=T*150$ into the second equation, the equation, $Y=(150*T)-(144*T)$, is determined. Then, the equation, $150/144=X/(X-Y)$, is determined by replacing T with X/150. In this equation, X is the maximum packet size that can be supported and Y is the size of buffer 112.

In one example, to support a maximum packet size of 10,000 bytes the equation becomes: $150/144=(10000*8)/(10000*8-Y)$, where Y=3200 bits or 400 bytes. Thus, buffer 112 is configured to hold 3200 bits or 400 bytes and can support a maximum packet size of 10,000 bytes.

Figure 4:
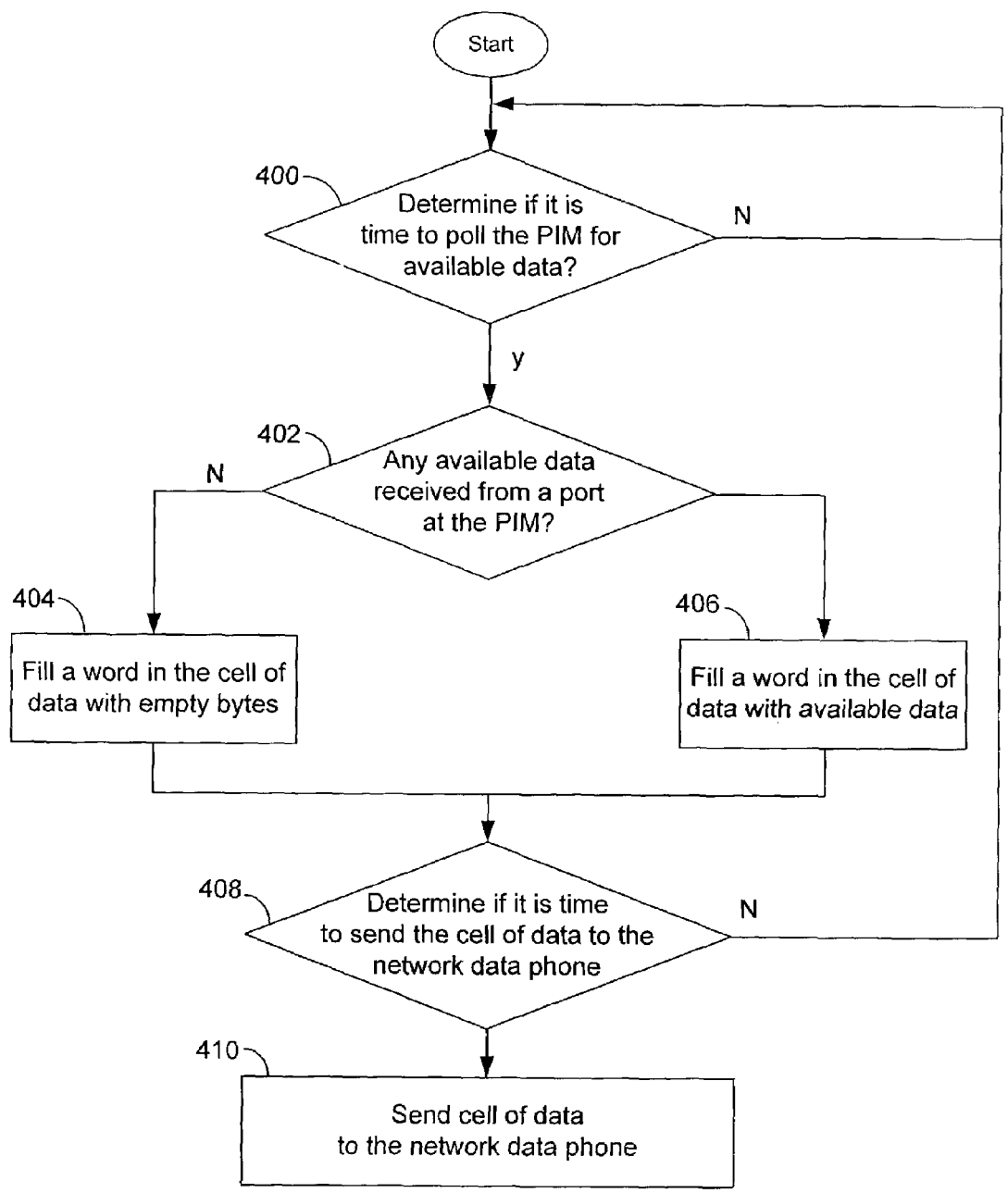
FIG. 4 illustrates a simplified flowchart for performing data rate adaptation in the ingress direction according to one embodiment.

FIG. 4 illustrates a flowchart for a method for performing data rate adaptation in the ingress direction according to one embodiment. In one embodiment, the cell of data is in the network data plane format.

When MIC 106 determines when to send the cell of data to network data plane 108, MIC 106 can determine when to poll PIM 104 for available data to fill the cell of data. The polling times are designed so the cell is filled and ready to be sent to network data plane 108 at the second data rate.

In step 400, MIC 106 determines if it is time to poll PIM 104 for available data. If it is not time, the method reiterates to step 300 where MIC 106 again determines if it is time to poll PIM 104 for available data.

In step 402, if it is time to poll PIM 104 for data, MIC 106 determines if PIM 104 has received any available data from a variable length frame of data from port 110 that may be included in the cell of data.

In step 404, if data is not available at PIM 104, MIC 106 fills a word in the cell of data with empty bytes. In one embodiment, a 32-bit word is filled with four empty byte characters.

In step 406, if data is available at PIM 104, the available data is filled into a word in the cell of data. In one embodiment, 32-bits of data is filled into a 32-bit word of the cell of data.

In step 408, MIC 106 determines if it is time to send the cell of data to network data plane 108. MIC 106 is configured so the cell of data is filled with either data from the frame of data, empty bytes, or any combination thereof, when it is time to send the cell of data.

In step 410, if it is time to send the cell data, MIC 106 sends the cell of data to network data plane 108.

If it is not time to send the cell of data, the method reiterates to step 300 where MIC 106 determines when it is time to poll PIM 104 for available data.

The above process of sending cells of data continues until the entire frame of data is received through port 110 has been sent to network data plane 108. When the entire frame of data has been sent, a frame boundary byte is added to indicate that the end of packet has been reached. The method reiterates to step 300.

Accordingly, a cell of data is sent from MIC 106 to network data plane 108 at intervals to satisfy the data rate of network data plane 108. Because the data rate of network data plane 108 is faster than the data rate of data received at PIM 104, data may not always be available at PIM 104 when data should be inserted into a cell of data. Thus, a cell of data may include empty bytes and network data plane 108 is configured to disregard the empty bytes. The faster data rate of network data plane 108 is thus maintained sending cells of data at the faster data rate with empty bytes, if needed.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for transferring an amount of data from a first system to a second system in a telecommunications system, the first system transferring data at a first data rate and the second system transferring data at a second data rate, the second data rate being higher than the first data rate, the method comprising:
    calculating a difference in data rates between the first data rate of the first system and the second data rate of the second system;
    calculating a partial amount of data from the amount of data to send to a buffer;
    sending the partial amount of data from the amount of data from the first system to the buffer; and
    sending the amount of data not already sent to the buffer along with the partial amount of data in the buffer to the second system, wherein a data rate of a total amount of data sent from the first system to the second system is substantially equal to the higher data rate of the second system, and
    wherein the partial amount of data is substantially equal to a maximum allowable amount of data to be transferred multiplied by the calculated difference in data rates and divided by the second data rate.

2. The method of claim 1, wherein the amount of data comprises a frame of data.

3. A method for transferring an amount of data from a first system to a second system in a telecommunications system, the first system transferring data at a first data rate and the second system transferring data at a second data rate, the second data rate being higher than the first data rate, the method comprising:
    calculating a difference in data rates between the first data rate of the first system and the second data rate of the second system;
    calculating a partial amount of data from the amount of data to send to a buffer;
    sending the partial amount of data from the amount of data from the first system to the buffer; and
    sending the amount of data not already sent to the buffer along with the partial amount of data in the buffer to the second system, wherein a data rate of a total amount of data sent from the first system to the second system is substantially equal to the higher data rate of the second system, and
    wherein sending the amount of data not already sent to the buffer comprises sending the amount of data to the buffer before sending the data to the second system.

4. A method for transferring an amount of data from a first system to a second system in a telecommunications system, the first system transferring data at a first data rate and the second system transferring data at a second data rate, the second data rate being higher than the first data rate, the method comprising:
    calculating a difference in data rates between the first data rate of the first system and the second data rate of the second system;
    calculating a partial amount of data from the amount of data to send to a buffer;
    sending the partial amount of data from the amount of data from the first system to the buffer; and
    sending the amount of data not already sent to the buffer along with the partial amount of data in the buffer to the second system, wherein a data rate of a total amount of data sent from the first system to the second system is substantially equal to the higher data rate of the second system, and
    determining a maximum amount of data to be transferred.

5. The method of claim 4, further comprising determining a buffer size from the maximum amount of data to be transferred, wherein the buffer size is substantially less than the maximum amount of data to be transferred.

* * * * *